(12) United States Patent
Gretz

(10) Patent No.: US 6,346,674 B1
(45) Date of Patent: Feb. 12, 2002

(54) MOUNTING DEVICE

(76) Inventor: Thomas J. Gretz, 1102 Oakmont Rd., Clarks Summit, PA (US) 18411

( * ) Notice: Subject to any disclaimer, the term of this patent is extended or adjusted under 35 U.S.C. 154(b) by 0 days.

(21) Appl. No.: 09/775,749

(22) Filed: Feb. 2, 2001

Related U.S. Application Data

(63) Continuation of application No. 09/262,528, filed on Mar. 4, 1999, now Pat. No. 6,194,657, which is a continuation-in-part of application No. 09/178,402, filed on Oct. 24, 1998, now Pat. No. 6,093,890, which is a continuation-in-part of application No. 08/935,144, filed on Sep. 22, 1997, now abandoned.

(51) Int. Cl.[7] ................................................ H01H 9/02
(52) U.S. Cl. ......................... 174/58; 174/48; 248/906; 220/3.8
(58) Field of Search ............................. 174/58, 48, 50, 174/66, 53, 54, 55, 56, 57, 61, 63, 67; 439/535; 220/3.8, 3.6, 3.7, 3.9, 241; 248/906; 361/730

(56) References Cited

U.S. PATENT DOCUMENTS

| | | | | | |
|---|---|---|---|---|---|
| 4,328,903 A | * | 5/1982 | Baars | .......................... | 220/3.7 |
| 4,638,963 A | * | 1/1987 | Hernandez | .................... | 248/56 |
| 4,993,575 A | * | 2/1991 | Maes | .......................... | 220/3.8 |
| 5,221,814 A | * | 6/1993 | Colbaugh et al. | ............. | 174/66 |
| 5,347,088 A | * | 9/1994 | Marsh et al. | .................. | 174/50 |
| 5,349,134 A | * | 9/1994 | Russell | ........................ | 174/48 |
| 6,102,360 A | * | 8/2000 | Clegg et al. | ................. | 248/906 |
| 6,229,087 B1 | * | 5/2001 | Archer | ......................... | 174/50 |

* cited by examiner

Primary Examiner—Dean A. Reichard
Assistant Examiner—Angel R. Estrada

(57) ABSTRACT

The present invention uses a plastic mounting device having an open front surface extending around an opening in a building wall integral with a closed electrical box extending at right angles therefrom rearward of the front surface and extending into the building wall. The mounting device has two turning screws adapted to turn flags which are inserted into the opening in a "closed" position and grab the far or inside surface of the building wall when the screws are rotated causing the flags to obtain their "open" position. An alternative embodiment incorporates a second set of flags positioned behind the first set for installatio in a wall too thick to permit engagement of the first set of flags.

4 Claims, 13 Drawing Sheets

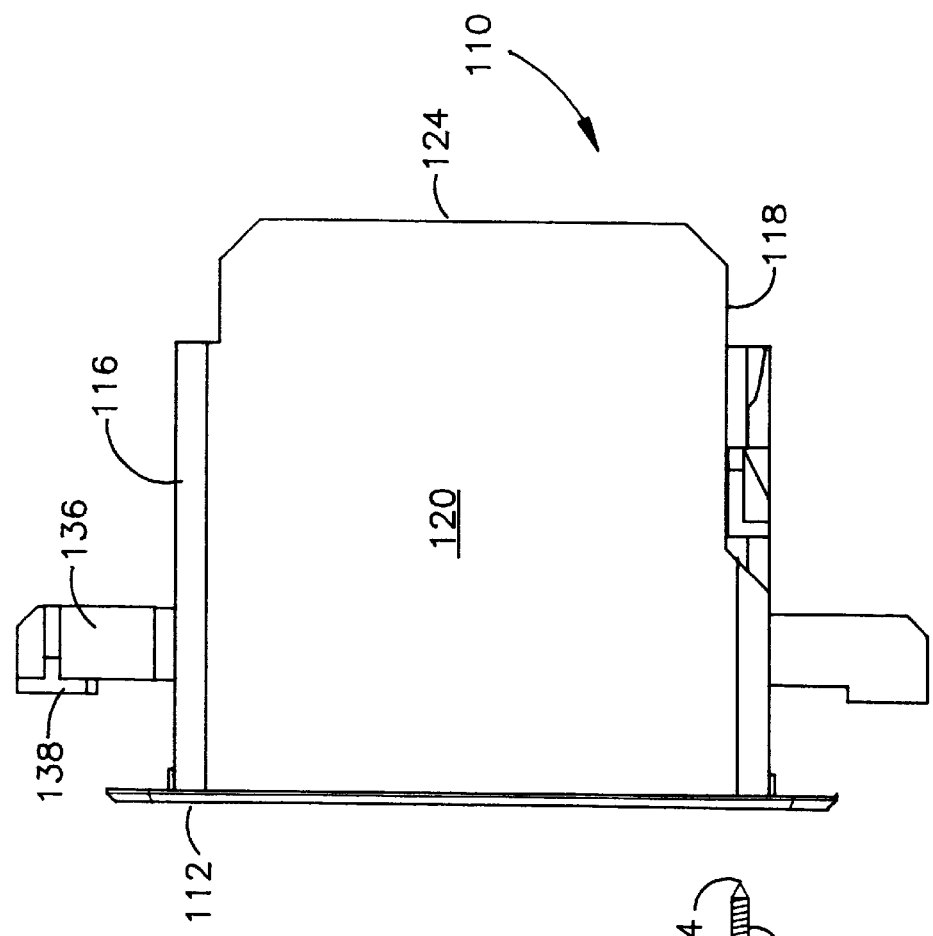
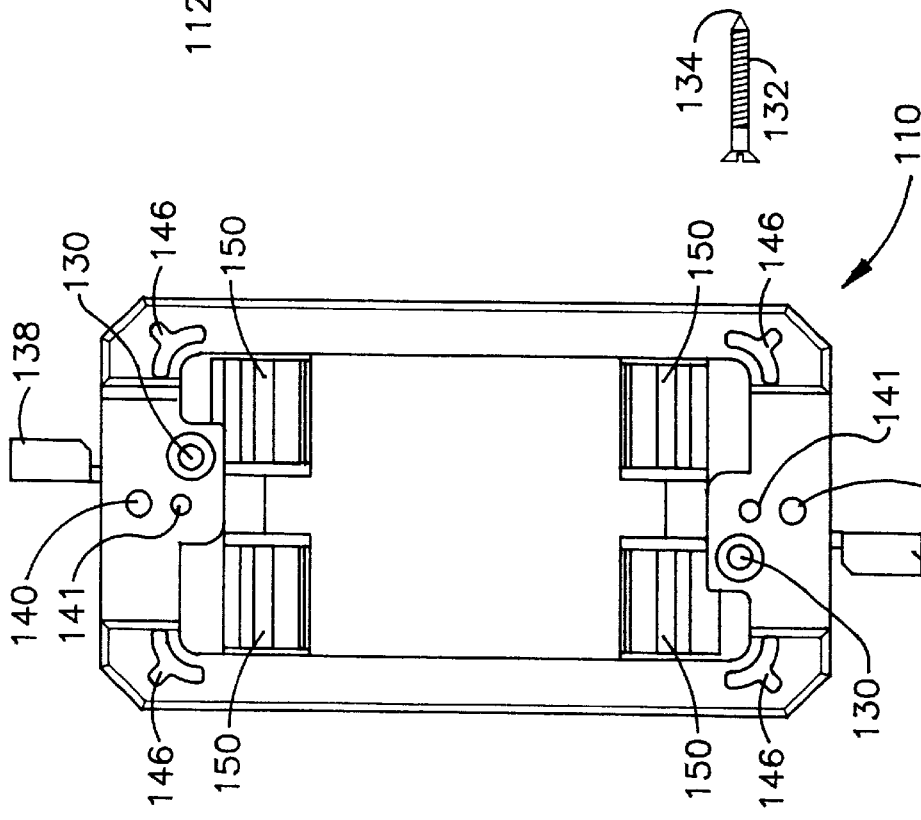

MOUNTING DEVICE

This is a continuation of application Ser. No. 09/262,528 filed Mar. 4, 1999 now U.S. Pat. No. 6,194,657, and now pending which was a continuation-in-part of application Ser. No. 09/178,402, filed Oct. 24, 1998, and now U.S. Pat. No. 6,093,890 which was a continuation-in-part of application Ser. No. 08/935,144 filed Sep. 22, 1997, abandoned.

FIELD OF THE INVENTION

The present invention relates to electrical mounting devices and especially to wall mounted electrical boxes.

BACKGROUND OF THE INVENTION

There exist several methods for installing an additional electrical outlet box in an existing wall. Most of these involve cutting a hole in the wall large enough to attach an electrical outlet box to a stud or other existing structural member and attaching a metallic or plastic box to the stud. Such installations pose the problem of having to cover the installation with an oversized cover. Additionally, the retrofitted outlet box may not be installed in exactly the position desired because of the need to attach it to an existing stud.

U.S. patent application Ser. No. 09/178,402, filed Oct. 24, 1998, now U.S. Pat. No. 6,093,890, the grandparent of this application, describes a low voltage wall mounting device that comprises a frame, an integral reinforcing flange that fits into a rectangular hole in a wall and two flags which are rotated by front mount screws for grabbing the rear surface of the wall and securing the mounting device to the wall. This copending application is incorporated herein by reference in its entirety. Such an arrangement permits installation of additional low voltage mounting devices or boxes at any location on the surface of a wall. Additionally, the hole cut for installation is approximately of the same size as the inserted box, making the use of an oversized cover plate unnecessary. This copending application suggests, but does not describe, that, "the flange or device wall may extend deeper into the building wall and have the inside enclosed to provide a box". The copending application, does not however address the issue as it relates to the more conventional electrical or "working" boxes that are used as outlets for electrical current that must include a closed rear portion that admits electrical wiring through appropriate apertures that incorporate wire or cable-retaining devices.

OBJECT OF THE INVENTION

It is therefore an object of the present invention to provide a working electrical outlet box that can be installed at virtually any location in a wall with a minimum of effort and a minimum of disruption of the existing wall.

SUMMARY OF THE INVENTION

The present invention uses a plastic mounting device having an open front surface extending around an opening in a building wall integral with a closed electrical box extending at right angles therefrom rearward of the front surface and extending into the building wall. The mounting device has two turning screws adapted to turn flags which are inserted into the opening in a "closed" position and grab the far or inside surface of the building wall when the screws are rotated causing the flags to obtain their "open" position. The electrical box has a rectangular outside periphery that permits a simple rectangular cut to be made in the building wall for ready fitting of the device into the wall. The flags are located on opposite ends of the open front surface or electrical box near the center of the two opposite ends so that holding forces are applied in the most desired direction without having such forces applied at opposite corners.

DESCRIPTION OF THE DRAWINGS

FIG. 19 is a rear view of an alternative embodiment of the mounting device of the present invention.

FIG. 20 is a left side view of the mounting device of FIG. 19.

DETAILED DESCRIPTION

Figure 1:
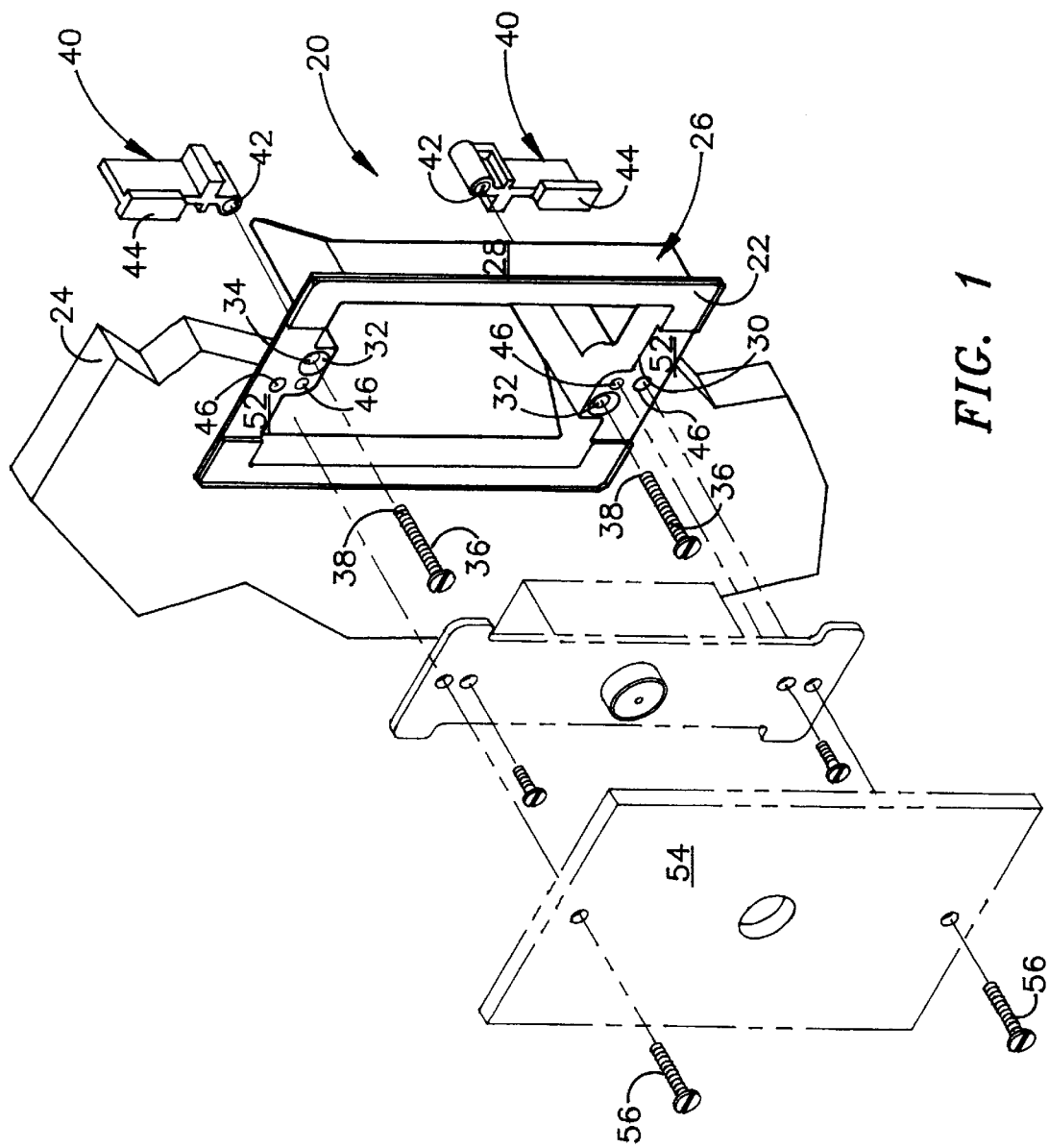
FIG. 1 is an exploded perspective view of the mounting device of the prior art in a wall.

With reference to FIG. 1, there is shown an exploded view of this device and the relationship that it has with the building wall when installed. There is shown a plastic mounting device 20 having an open front plate 22 adapted to extend around an opening in a wall 24. Integral with open front plate 22 is a flange or device wall 26 extending at right angles to the inside periphery of the plate that is adapted to extend into the opening in the building wall 24. It is to be noted that flange or device wall 26 may extend deeper into the building wall and have the inside enclosed (not shown in this Figure) to provide a box.

The right angle of the front plate 22 and flange 26 extend around the mounting device on all four sides and serve as a structural stiffener.

Figure 10:
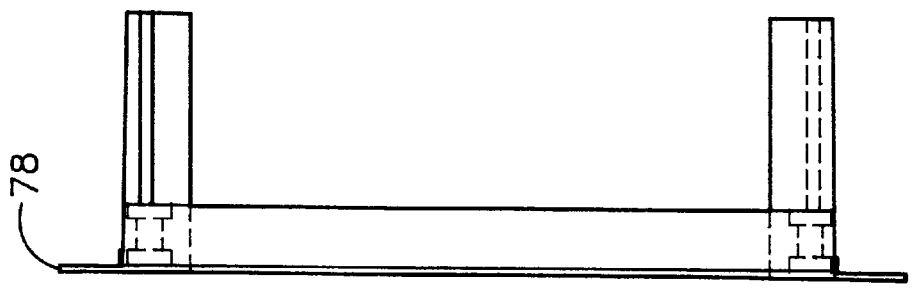
Figure 9:
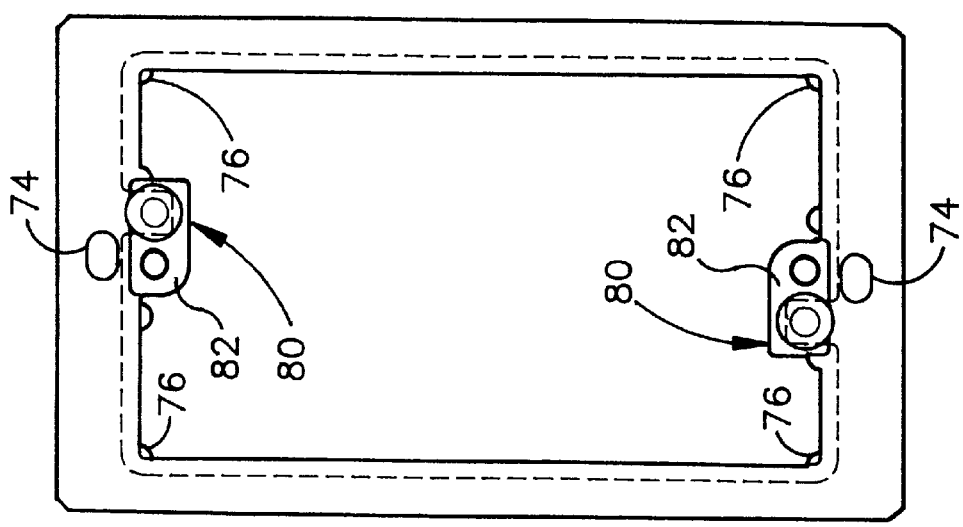
Figure 11:
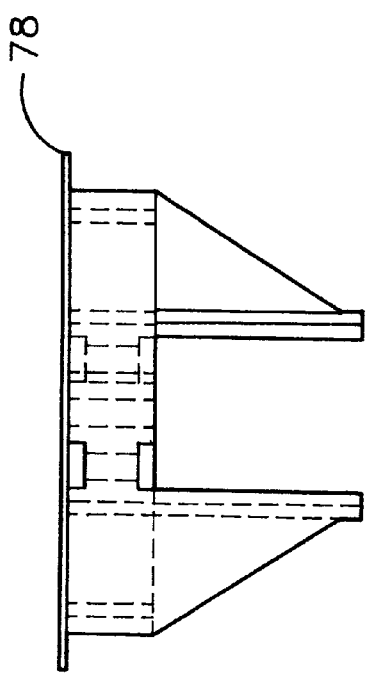
Figure 13:
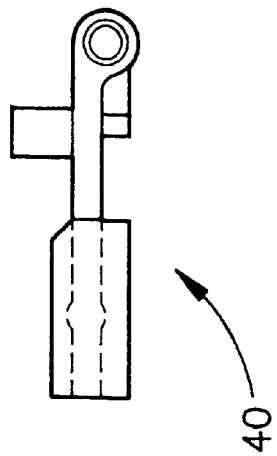
Figure 12:
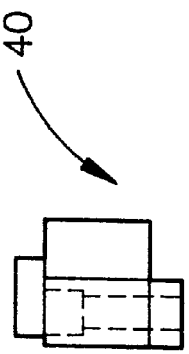
Figure 14:
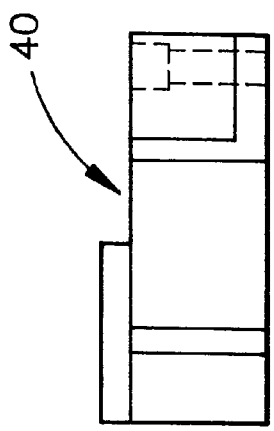
Figures 15, 16:
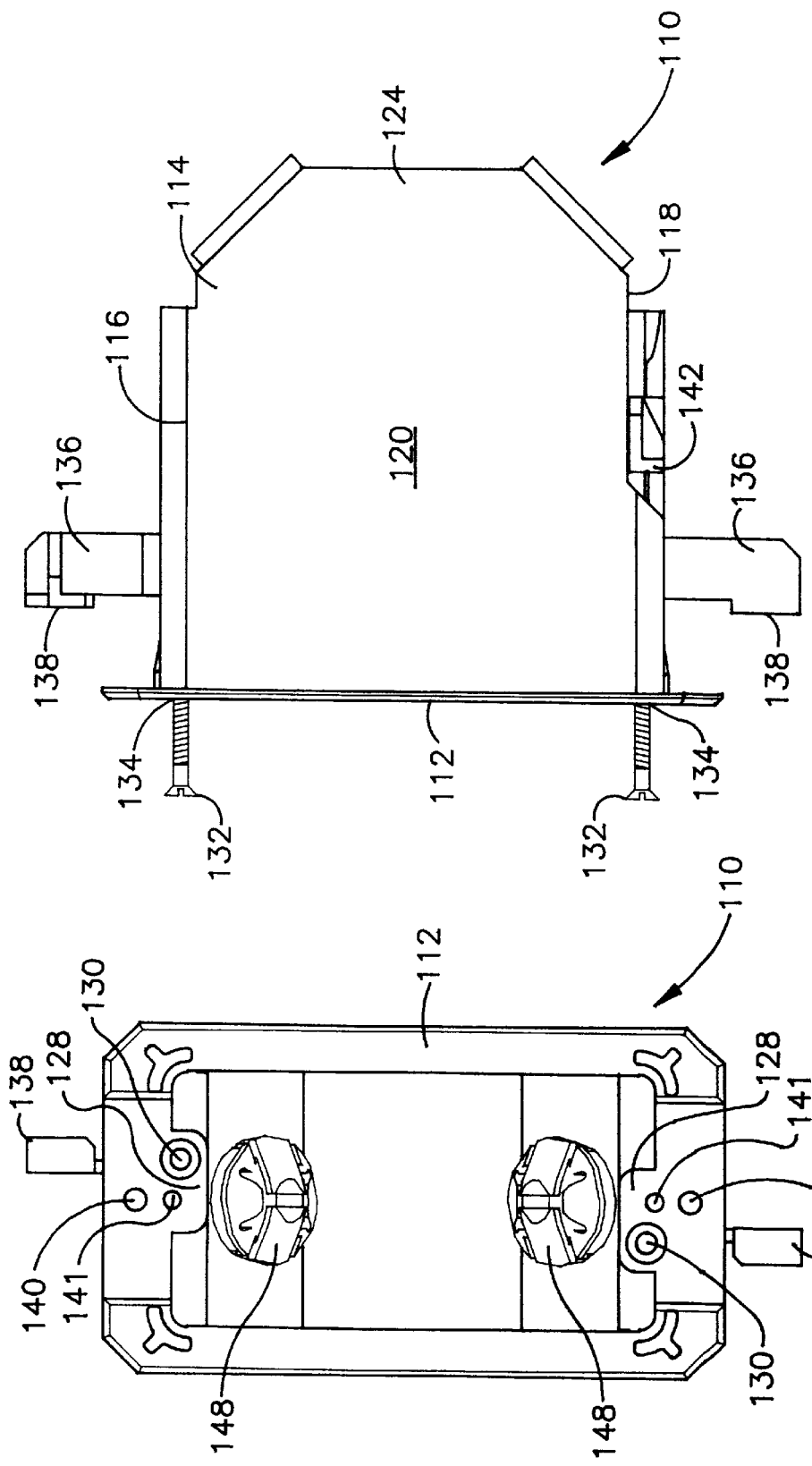
FIG. 15 is a front view of the mounting device of the present invention.
FIG. 16 is a left side view of the mounting device of FIG. 15.

The outside periphery 28 of the flange 26 is perfectly rectangular in shape as best seen in FIG. 10. This permits an opening to be made in the building wall 24 by simply cutting a rectangular hole with a minimum of effort and dropping the mounting device 20 into the hole. The outside periphery 28 extends into the opening and is usually of a length approaching the thickness of a standard wallboard but may be deeper as indicated above.

Figure 4:
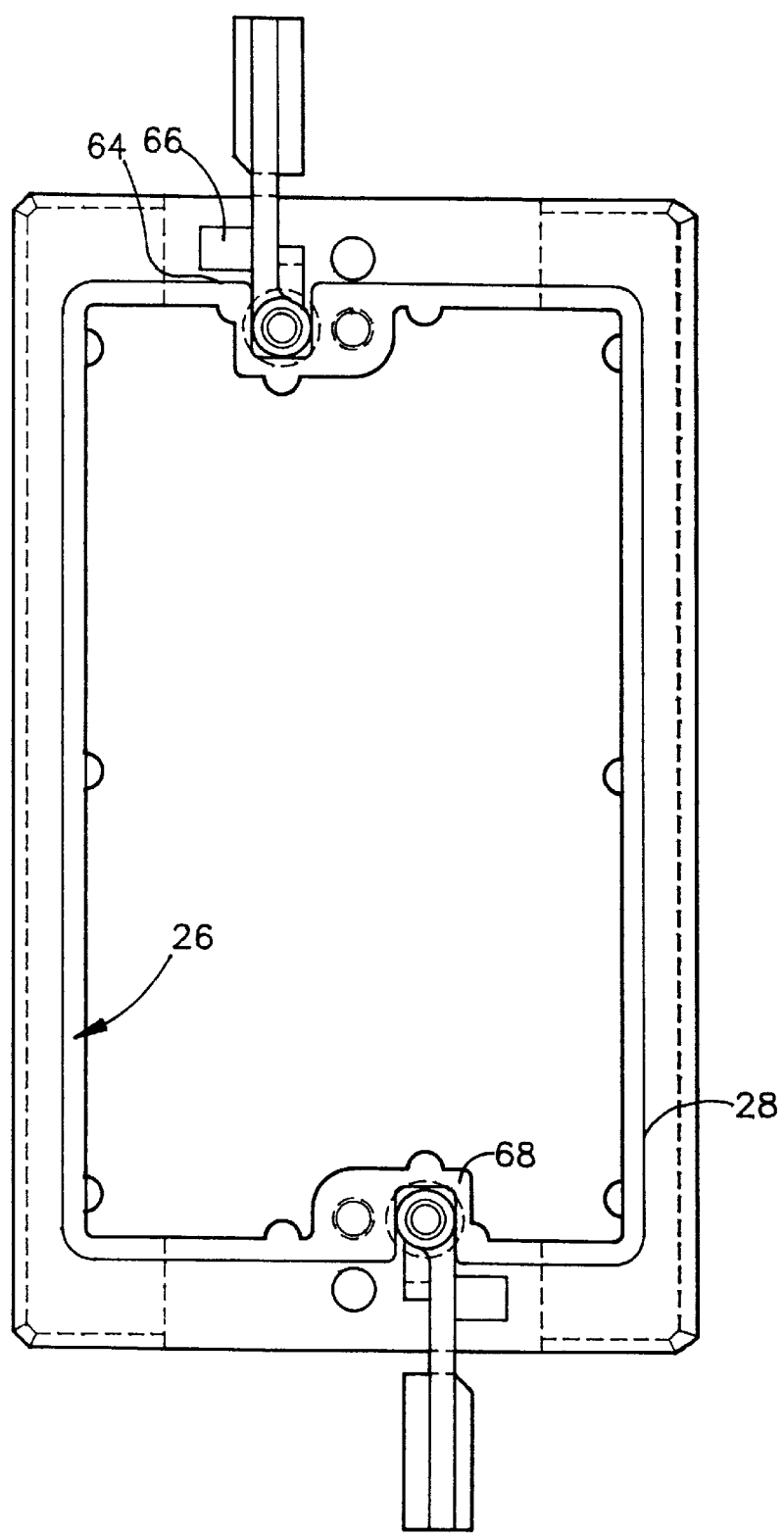
FIG. 4 is a back plan view of the mounting device of the prior art with flags extended.

At an inside periphery 30 of front plate 22 and integral therewith are mounting blocks 32. It is to be noted that the mounting blocks 32 are located on opposite sides of said mounting device and preferably, although not necessarily, in the approximate center of the side. This is best seen in FIG. 4 where the mounting blocks are located in the preferable middle half of the top and bottom of open front plate 22. The reason for this will be discussed later.

Within each of the mounting blocks 32 are turning screw holes 34 each of which contain turning screws 36 which freely rotate in the holes 34 that are smooth and not threaded. Each turning screw 36 has a leading edge 38. The leading edge 38 is adjustably carried by the mounting device 20 to the flags 40. Each flag 40 has a hole 42 which receives the leading edge 38 of the screws 36 that are threaded therein with a friction fit.

After a rectangular hole has been cut in building wall 24, the mounting device 20 is inserted therein and the two turning screws 36 are turned clockwise to flip flags 40 into position. As the turning screws continue to turn, they draw the pads 44 to the inside surface of wall 24 to hold the plastic mounting device 20 firmly in position.

The advantage of having the mounting blocks 32 in the middle half of the front is so that the forces which firmly hold the mounting device 20 is positioned are balanced. This is to be compared to having the force of the turning screw 36 applied at the corners such as would be the case of standard work boxes.

After the mounting device has been firmly fixed in position, various other device holders may be screwed into holes 46. As shown in phantom lines in FIG. 1 a co-axial cable box 48 is held in position by screws 50 with the ends of the box being received in recesses 52. Overlaying the mounted device is cover plate 54 that is held in position by screws 56. Other similar devices may also be mounted as the co-axial cable boxes are merely representative of one type.

Figure 7:
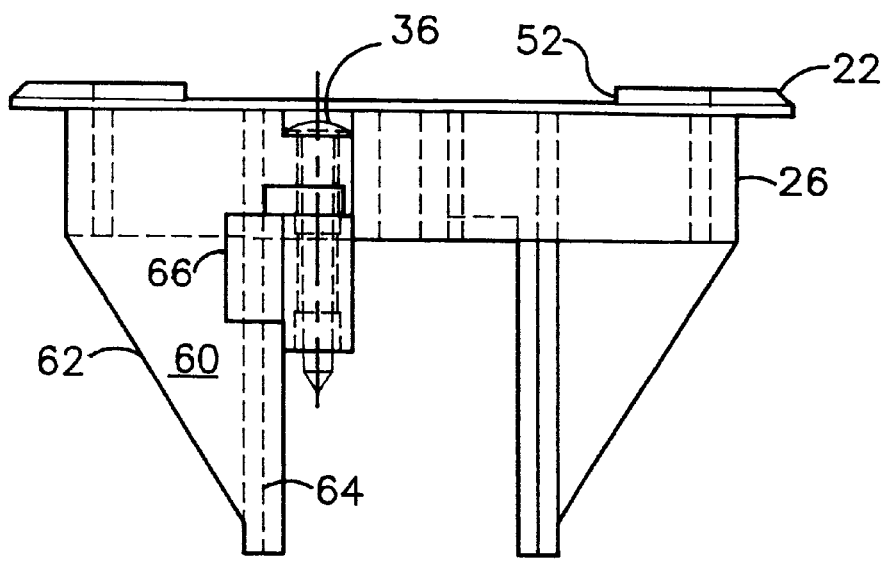
FIG. 7 is a view of the opposite end of FIG. 5 from that of FIG. 6
Figure 8:
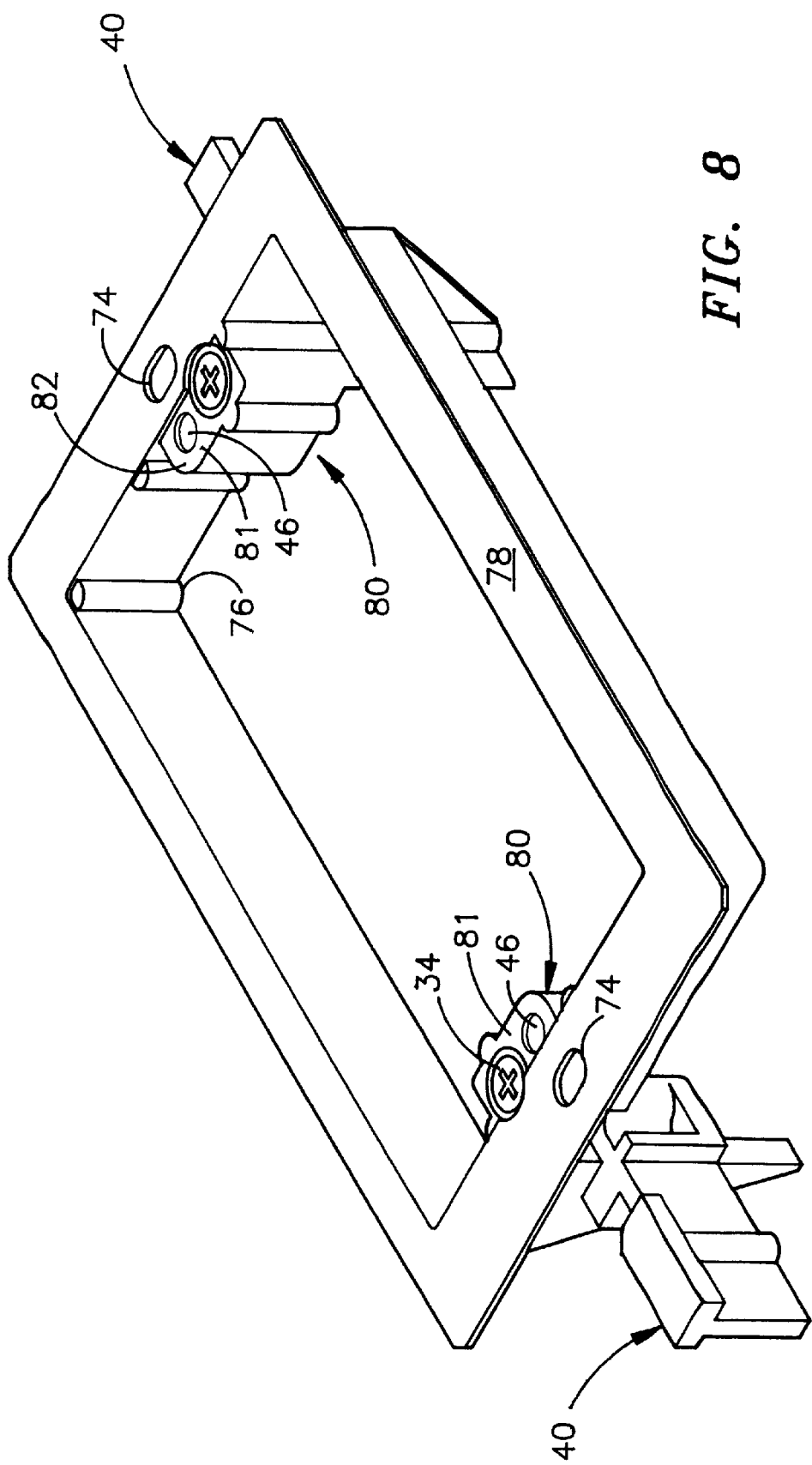
FIGS. 8 to 14 show another embodiment similar to the embodiment shown in FIG. 2.

Surrounding the inside periphery of flange 26 are a series of parallel reinforcing ridges 58 which help to stiffen the wall of the flange as best seen in FIG. 7 and also may provide an ejector for removing the member from a mold after molding.

Figure 2:
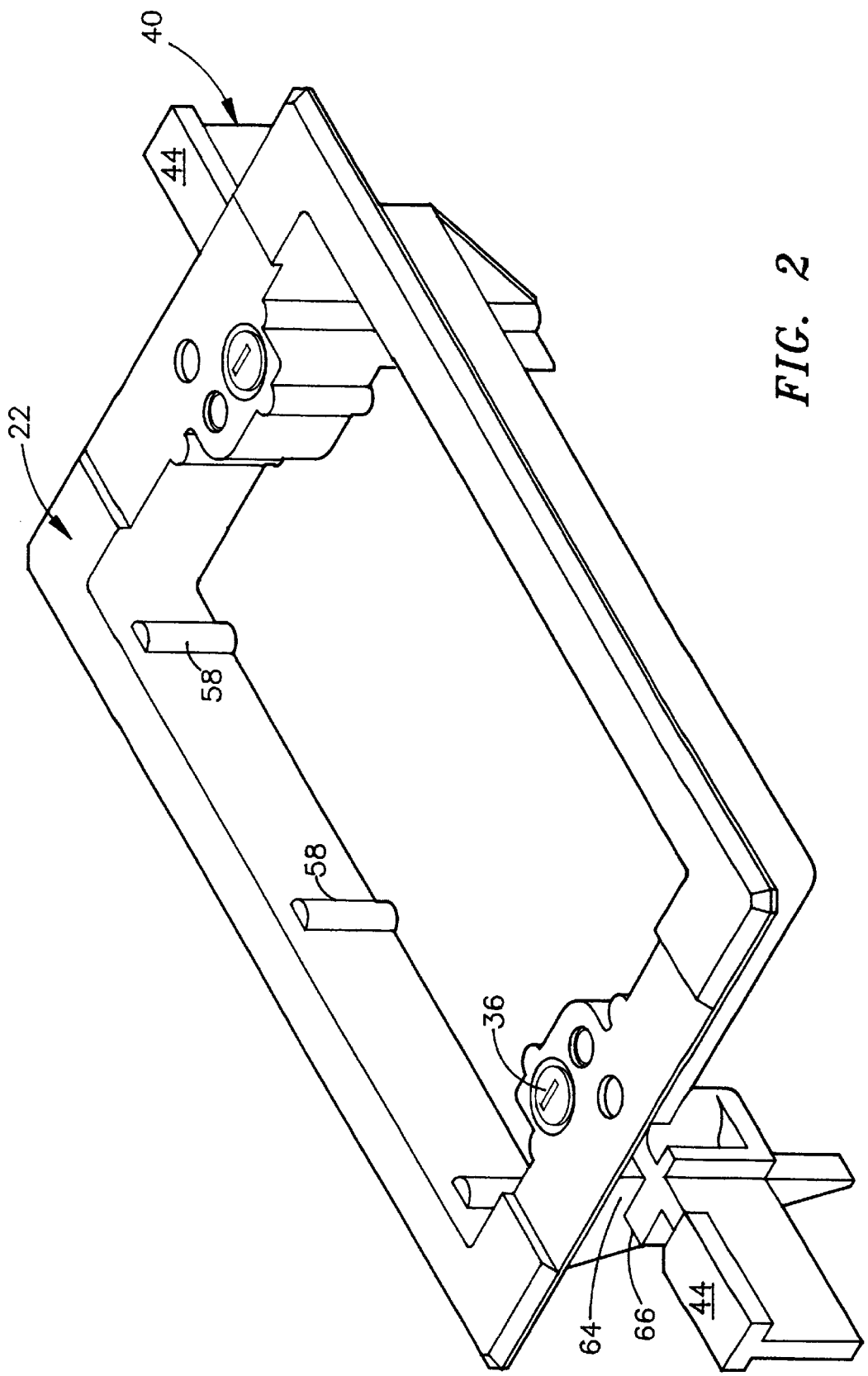
FIG. 2 is a perspective view of the mounting device of the prior art.
Figure 3:
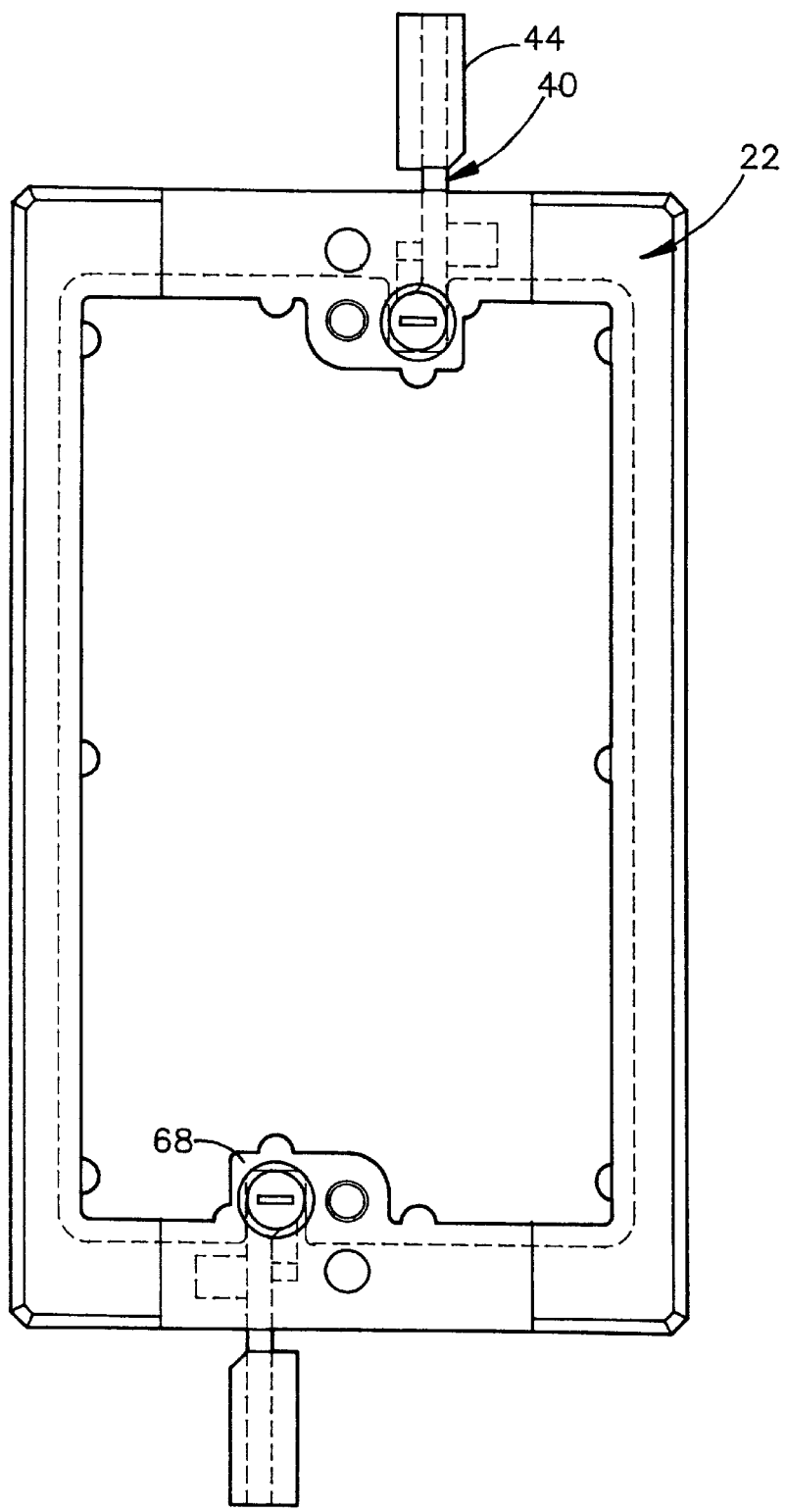
FIG. 3 is a front plan view of the mounting device of the prior art with flags extended.
Figure 5:
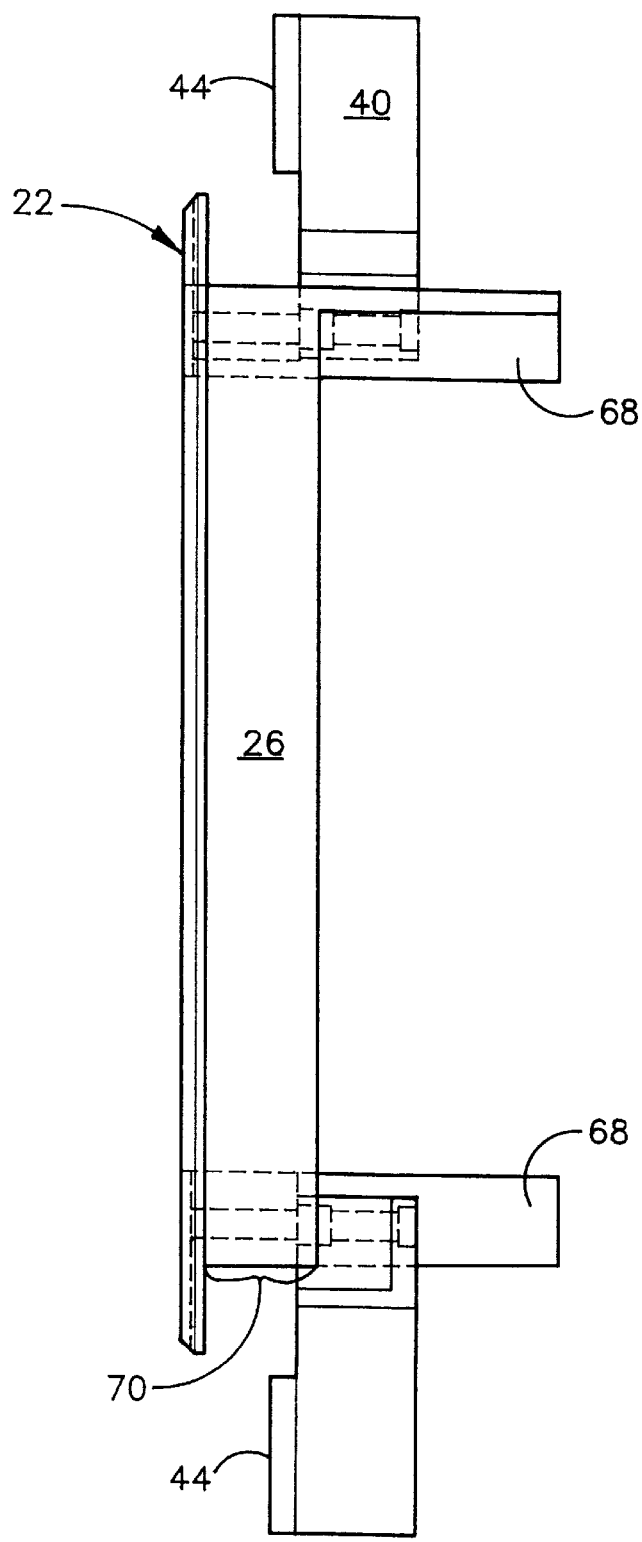
FIG. 5 is a side view of FIG. 4.

As best seen in FIGS. 1, 2, and 5 flange or device wall 26 has an extension, which is extended inward beyond the thickness of the plaster board or sheetrock wall 24 by guidepost 60. The guidepost has a triangular gusset 62 to assist in holding the post in position and a sliding surface 64. The flag 40 has a slide member 66 that moves along side surface 64 as the screw 36 is tightened. While the triangular gusset 62 is of the same thickness and an extension of the flange 26, it also has an integral flange 68 that is an inward extension of the mounting block 32. When the mounting device 20 is first inserted in an opening in the wall, the flags 40 are free to swing within the opening. Once screw tightening pressure is applied to turning screw 36, the flags flip in a direction of the turning screw until the slide member 66 is arrested by sliding surface 64. Continued tightening of the screw causes the flags 40 to be pulled toward the front plate 22 which is fastened securely to the wall from the inside by flange 40. It is to be noted that the flange 26 extends from the back face of the front plate 22, a distance approximating the thickness of the wall in which the mounting device 20 is secured and is best seen in FIG. 10 but may extend deeper. The pads 44 extend beyond the body of the flag 40 in a direction towards the rear face of the front plate so that substantially all of the retaining pressure from the flag is carried by the surface of the pad pushing against the rear surface of wall 24.

Figure 6:
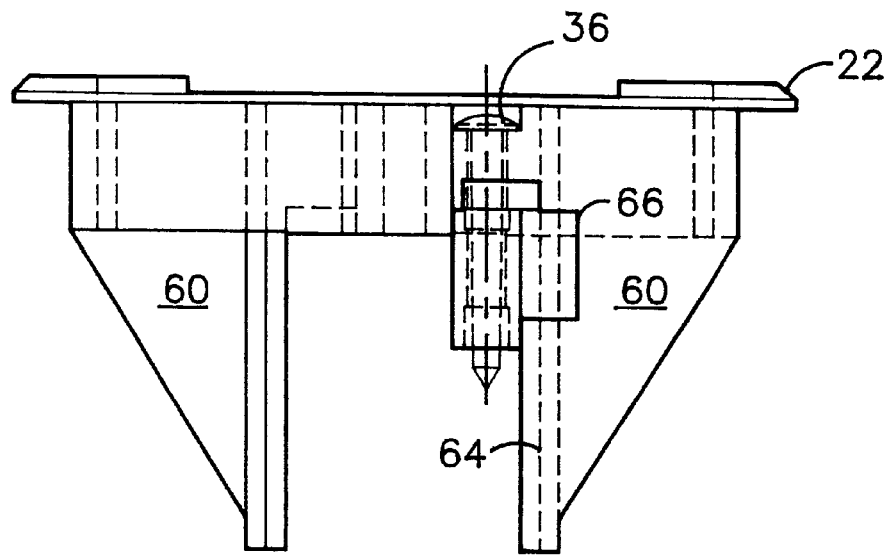
FIG. 6 is an end view of FIG. 5.

A seen in FIG. 6, the slide member 66 can be drawn in the direction of the front plate until the pad 44 contacts the wall. Since some drywall may have a thickness as thin as one quarter of an inch, the wall end of the flag may be pulled toward the wall as far as the notch 72 for thin walls.

With reference to FIGS. 8 to 14, there is shown the best-preferred embodiment of the invention. This embodiment is an importantly modified version of the prior embodiment with four major improvements.

First, slotted hole 74 has a height of approximately 0.156 inches and a width of approximately 0.248 inches or more. This arrangement permits the use of wall plates or devices whose holes do not quite line up if merely a circular hole is utilized.

Second, the reinforcing ridges and injector knockout 76 are moved to the corners of open front plate 22. This removes the interference with some cable boxes or other devices that are fastened to the mounting device.

Third, the embodiment has a front plate 78 whose thickness is only approximately 0.025 inches to 0.35 inches and preferably approximately 0.030 inches. This permits a mounting device that is usually hidden when covered with a faceplate.

Fourth, mounting block 80 which contains hole 46 but not slotted hole 74 has an outer face 81 that is below or recessed from the outer surface 78 of front plate 22 by a distance from approximately 0.025 to approximately 0.040 inches and preferably approximately 0.030 to approximately 0.35 inches. This permits face plates or other devices to be utilized so that mounting device 20 is completely covered by the face plate.

As shown in FIGS. 15–18 that depict various views of a first preferred embodiment of the mounting device of the present invention, the mounting device of the present invention 110 comprises an open front plate 112 adapted to extend around an opening in a wall (not shown). Integral with open front plate 112 is an electrical outlet box 114 that extends rearward from open plate 112. Electrical outlet box 114 comprises an enclosed space having top and bottom walls 116 and 118, right and left walls 120 and 122 and rear wall 124.

The outside periphery of electrical box 114 is rectangular in shape. This permits an opening to be made in a building wall by simply cutting a rectangular hole with a minimum of effort and dropping mounting device 110 into the hole.

At the inside periphery 126 of electrical box 114 and integral therewith, are mounting blocks 128. It should be noted that mounting blocks 128 are located on opposite sides of mounting device 110 and preferably, although not necessarily in the approximate center of the side. The reason for this preferred orientation will be discussed in greater detail below.

Within each of mounting blocks 128 are turning screw holes 130 each of which are designed to receive, but not engage, a turning screw 132, screw holes 130 being smooth and not threaded and of a size to permit free passage of turning screw 132 therein. Each turning screw 132 has a leading edge 134. Leading edge 134 is adjustably carried through screw hole 130 to a flag 136. Each flag 136 includes at its base 137, a hole that receives leading edge 134 of turning screw 132. Base 137 is threaded for a friction fit. The exact design and fitting of the various members that permit rotation of flag 136 are described in detail hereinabove.

After a rectangular hole has been cut in the building wall as previously described, the mounting device is inserted therein as also described hereinabove with flags 136 in their "retracted" position, two turning screws 132 inserted into screw holes 130 and turned clockwise causing flags 136 to rotate upward into their "extended" position integral with open front plate 112 is an electrical outlet box 114 that extends rearward from open front plate 112. Electrical outlet box 114 comprises an enclosed space having top and bottom walls 116 and 118, right and left walls 120 and 122, and rear wall 124.

Figure 18:
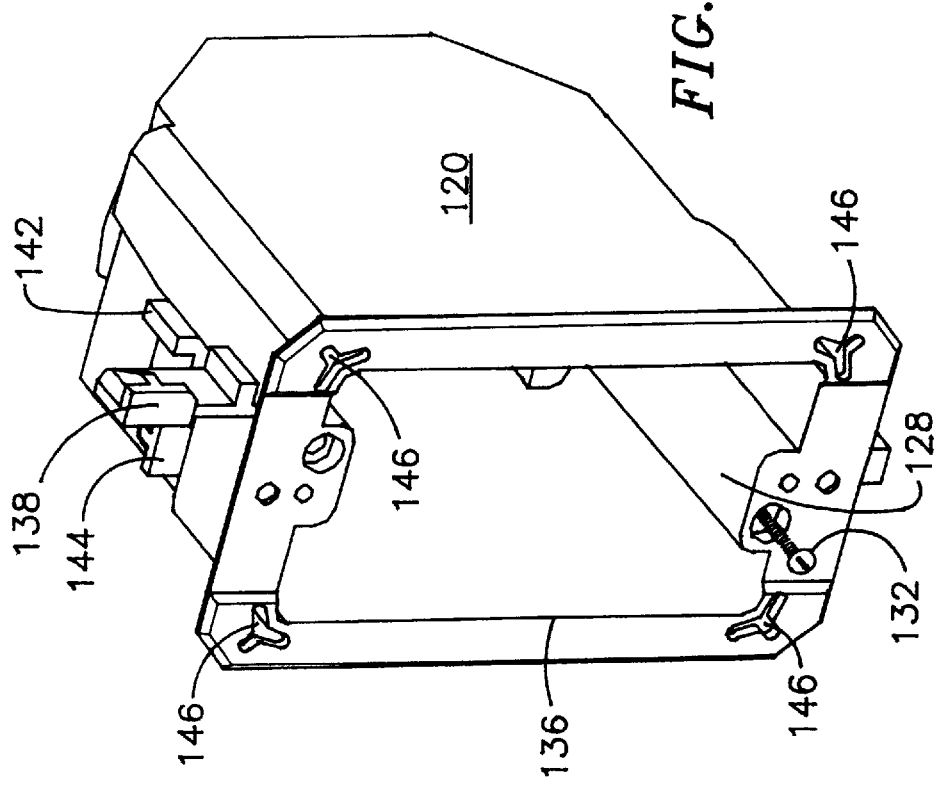
FIG. 18 is a perspective view of the mounting device of FIG. 15.
Figure 17:
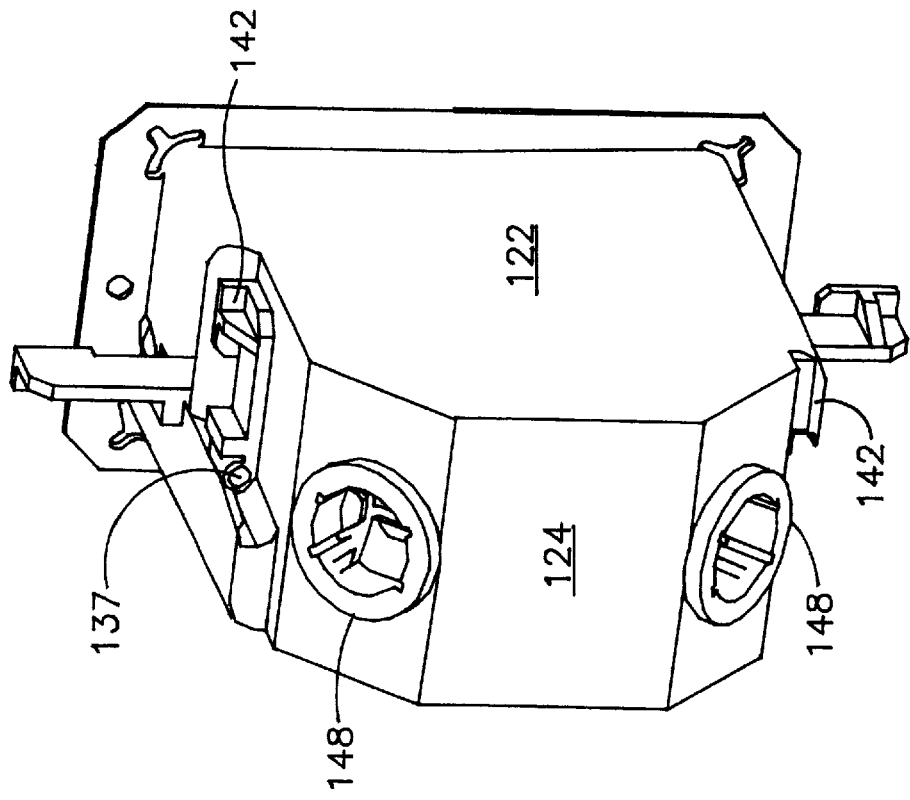
FIG. 17 is a rear view of the mounting device of FIG. 15.
Figures 21, 22:
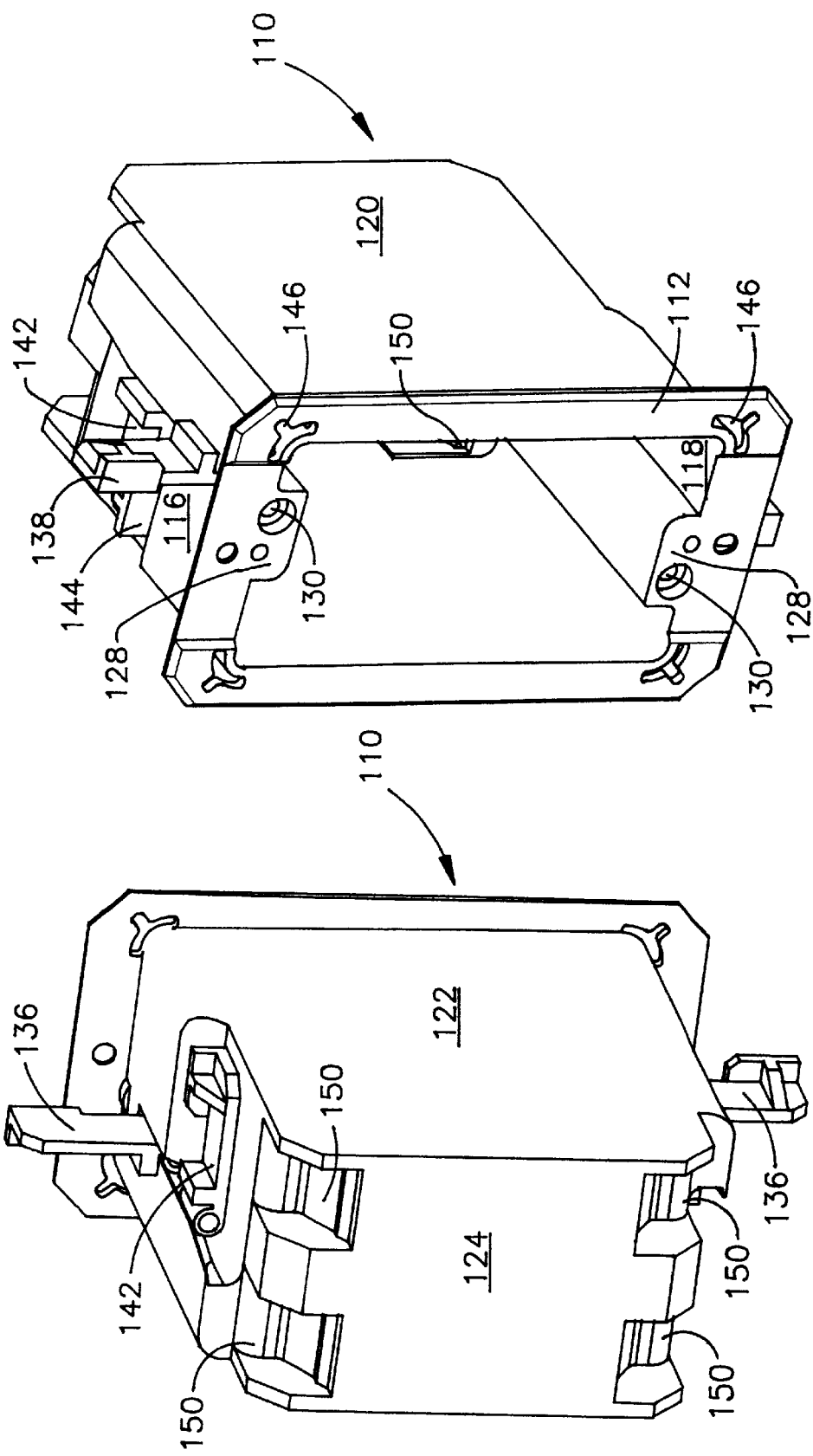
FIG. 21 is a rear perspective view of the mounting device of FIG. 19.
FIG. 22 is a front perspective view of the mounting device of FIG. 19.

As shown most clearly in FIGS. 17 and 18, according to a second preferred embodiment of the mounting device of the present invention, a second set of flags 142 can be included and rotatably mounted in mounting blocks 128 in line with and behind flags 136 for installation in a wall surface of a thickness greater than that engageable by flags 136. In this situation, turning of turning screws 132 as they frictionally engage the base 137 of flags 136 will cause flags 136 to attempt to reach their extended position. When flags 136 cannot deploy because of the presence of a too thick wall, turning screws 132 will continue to penetrate until they engage base 137 of flags 142 thereby causing flags 142 to rotate into their extended position with surface 144 engaging the rear surface of the thicker wall. At this time, flags 142 behave just as did flags 136 in the earlier description.

The advantage of having mounting blocks 128 in the middle half (50%) of the opening of faceplate 112 is so that the forces that hold mounting device 110 in position are balanced. This is to be compared to having the force of turning screws 32 applied at the corners, as would be the case with standard retrofit electrical workboxes.

After mounting device 110 has been firmly fixed in position, various other conventional devices such as electrical outlets, switches etc. and a cover plate can be mounted to mounting device 110 in the conventional manner through insertion of appropriate screws into holes 140 and 142.

Other elements of the mounting box 110 depicted in FIGS. 20–23 include arcuate slots in each corner of open front plate 112. These slots are positioned for receipt of fasteners such as sheet metal, wood or other screws or nails to secure mounting device 110 on a surface comprised of wood, metal or some other material of such a thickness and/or strength that it is impractical to utilize flags 136 and/or 142 to secure mounting device 110 in position. In this case the universality of mounting device 110 permits attachment in a more conventional manner through the use of conventional fasteners in slots 146 which are attached by insertion into the material of the wall to which attachment is being made.

Another feature of this preferred embodiment is the inclusion of threaded apertures in the transition zone from rear side 124 and top 118 and bottom 116 of electrical box 114 for insertion and attachment of suitable threaded cable/wire retainers 148. Such threaded apertures, could, of course, be in rear side 124, if desired.

FIGS. 19–22 depict yet another embodiment of the mounting device of the present invention. According to this embodiment, all of the elements of mounting device 110 are identical to the earlier described embodiments of FIGS. 15–18 except that electrical box 114 has been modified to include more conventional knockouts 150 in the transition zone between the rear side 124 and top 118 and bottom 116 of electrical box 114. Knockouts 150 are in lieu of threaded apertures for receiving threaded wire/cable retainers 148 shown in FIGS. 20–23 and of the type found in general use in electrical outlet or working boxes commonly in use.

From the foregoing description, one skilled in the art can easily ascertain the essential characteristics of this invention, and without departing from the spirit and scope thereof, make various changes and modifications of the invention to adapt it to various usages and conditions. It is therefore intended that the scope of the invention be limited only by the scope of the appended claims.

What is claimed is:

1. A plastic mounting device comprising:
   an open front plate having top and bottom and side portions and
   adapted to extend around an opening in a building wall;
   integral mounting blocks on said top and bottom portions and within said open front plate;
   a turning screw hole in each of said mounting blocks allowing free passage of a threaded turning screw having a leading edge;
   at least one flag, having a base, rotatably attached to each of said mounting blocks; and
   a hole in each of said bases for receiving with a friction fit said leading edge of said turning screws such that when said threaded turning screw is rotated in said turning screw hole, said flag rotates.

2. The mounting device of claim 1 wherein said open front plate is rectangular.

3. The mounting device of claim 1 further including a second flag, having a base, rotatably attached to each of said mounting blocks at a position behind said flag.

4. The mounting device of claim 1 wherein said open face plate has a front surface, said mounting blocks have a front surface and said mounting block front surface is recessed below said open face plate front surface.

* * * * *

UNITED STATES PATENT AND TRADEMARK OFFICE
CERTIFICATE OF CORRECTION

PATENT NO.   : 6,346,674 B1  
DATED        : February 12, 2002  
INVENTOR(S)  : Thomas J. Gretz It is certified that error appears in the above-identified patent and that said Letters Patent is hereby corrected as shown below:

<u>Column 2,</u>  
Lines 9, 11, 13 and 15, the portion of the sentences reading "prior art" for each occurrence, should read -- present invention --.

Signed and Sealed this

First Day of April, 2003

JAMES E. ROGAN  
*Director of the United States Patent and Trademark Office*